Feb. 16, 1960 J. A. CASH, SR 2,925,057
MATTRESS TAPE EDGE SEWING APPARATUS
Filed May 15, 1957 7 Sheets-Sheet 1
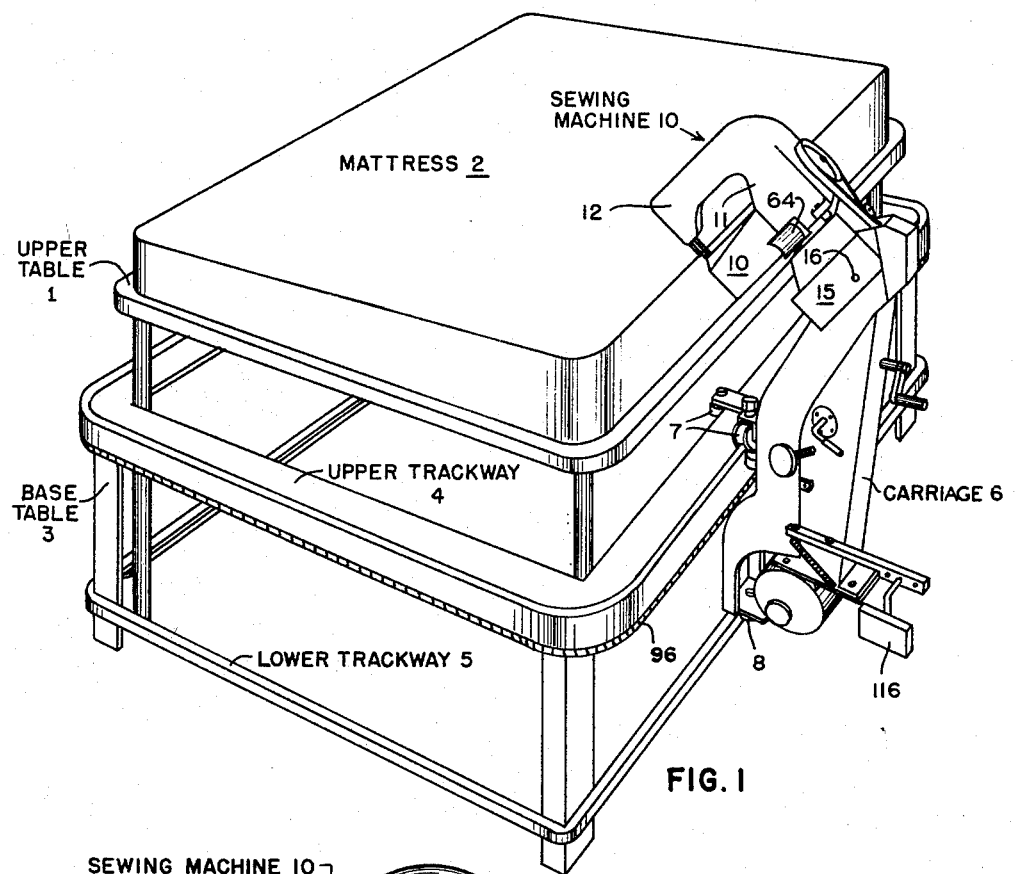
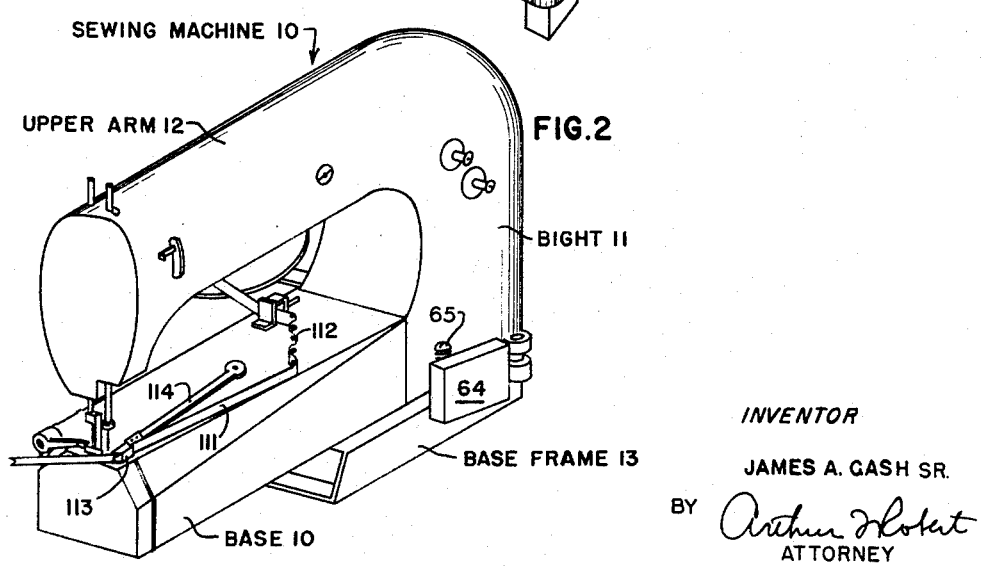
INVENTOR
JAMES A. CASH SR.
BY Arthur H. Robert
ATTORNEY Feb. 16, 1960

J. A. CASH, SR 2,925,057

MATTRESS TAPE EDGE SEWING APPARATUS

Filed May 15, 1957

INVENTOR
JAMES A. CASH SR.
BY *Arthur Robert*
ATTORNEY

Feb. 16, 1960     J. A. CASH, SR     2,925,057
MATTRESS TAPE EDGE SEWING APPARATUS
Filed May 15, 1957     7 Sheets-Sheet 3
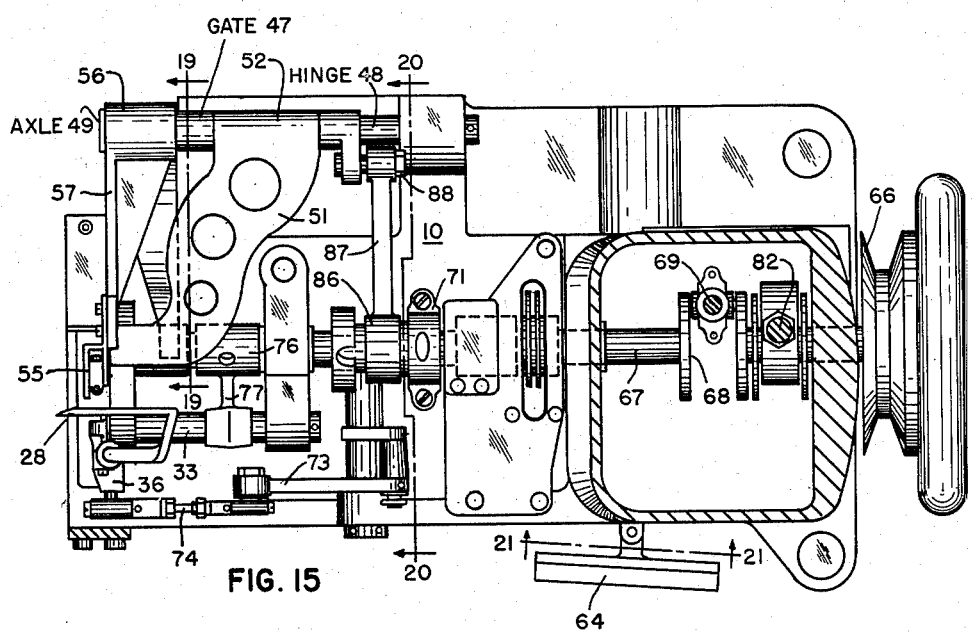
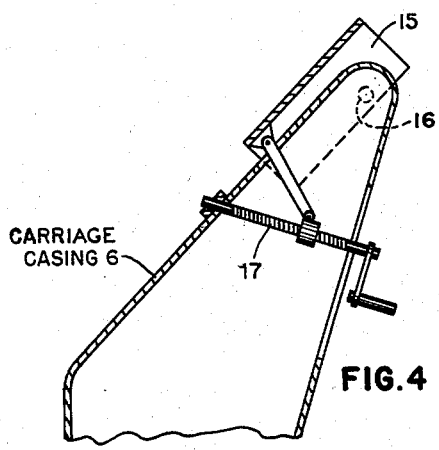
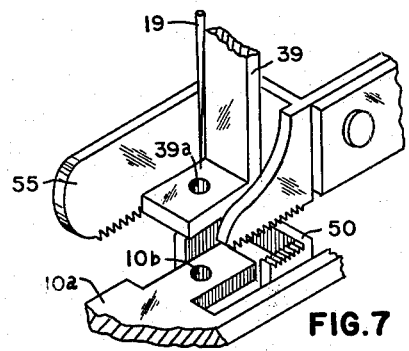
INVENTOR
JAMES A. CASH SR.
BY *Arthur H Robert*
ATTORNEY Feb. 16, 1960 J. A. CASH, SR 2,925,057
MATTRESS TAPE EDGE SEWING APPARATUS
Filed May 15, 1957 7 Sheets-Sheet 4

*INVENTOR.*
JAMES A. CASH SR.
BY
ATTORNEY

Feb. 16, 1960 J. A. CASH, SR 2,925,057
MATTRESS TAPE EDGE SEWING APPARATUS
Filed May 15, 1957 7 Sheets-Sheet 5

INVENTOR.
JAMES A. CASH SR.
BY
ATTORNEY

Feb. 16, 1960   J. A. CASH, SR   2,925,057
MATTRESS TAPE EDGE SEWING APPARATUS
Filed May 15, 1957   7 Sheets-Sheet 6

INVENTOR.
JAMES A. CASH SR.
BY
Arthur Robert
ATTORNEY

Feb. 16, 1960 J. A. CASH, SR 2,925,057
MATTRESS TAPE EDGE SEWING APPARATUS
Filed May 15, 1957 7 Sheets-Sheet 7

INVENTOR
JAMES A. CASH SR.
BY Arthur J. Robert
ATTORNEY

Patented Feb. 16, 1960

2,925,057

MATTRESS TAPE EDGE SEWING APPARATUS

James A. Cash, Sr., Louisville, Ky., assignor to James Cash Machine Co., Inc., Louisville, Ky., a corporation of Kentucky Application May 15, 1957, Serial No. 659,346

14 Claims. (Cl. 112—3)

This invention relates to mattress edge sewing apparatus.

The conventional apparatus includes: (1) a mattress supporting table; (2) a carriage mounted on the table for movement around its periphery; (3) a mattress edge sewing machine mounted on the carriage; and (4) drive means to move the carriage around the table at a slow fixed lineal speed and to operate the sewing machine needle at a relatively high fixed reciprocating speed to sew a fixed number of stitches (say 8) per inch.

The conventional mattress edge sewing machine comprises: (a) a hollow C-shaped housing having a base over which the work is moved rearwardly as it is sewn, a vertical bight and a horizontal upper arm overlying the work on the base; (b) an oscillating frame extending through the base, bight and arm of the housing and being pivotally mounted for oscillation about a vertical axis to swing its free ends forwardly and rearwardly; (c) stitching mechanism including (1) a needle vertically mounted in the housing arm on the free end of the oscillating frame arm for horizontal swinging movement therewith and for relative vertical reciprocation extending through the work and (2) thread locking means mounted in the housing base below the work; (d) a presser foot mounted in and on the housing arm above the work for vertical reciprocation toward and away from the work; (e) a pair of work feeding jaws, one mounted on the upper arm and the other on the lower arm of the oscillating frame for horizontal swinging movement therewith and for vertical jaw closing and opening movement relatively thereto; and (f) drive means to oscillate said oscillating frame at high speed, said means being operative, (1) during each rearwardly directed swing of the oscillating frame, to feed the work by closing the jaws so as to pull the work rearwardly and to sew the work by vertically reciprocating the rearwardly moving sewing needle once and cooperatively moving the thread locking means horizontally once to sew one stitch in the work as it is fed rearwardly and, (2) during each forwardly directed swing of the oscillating frame, to clamp the work against the base with the housing mounted presser foot while contemporaneously opening the frame-mounted jaws to release them from the work and move them forwardly along the work.

The conventional apparatus has a number of objections. It is subject to frequent breakdowns which appear to be due, in large measure at least, to the excessive strains and vibrations occasioned by the rapid oscillation of the unwieldy oscillating frame and the parts carried by it. The large amount of maintenance required to keep it operating and the loss of production time during its frequent breakdowns make its use very costly. Also it can only sew one length of stitch because it is not practical to change the fixed number of stitches per inch for which it was initially designed. Any change or adjustment of this character involves: a change in the "fast-slow" ratio of fast sewing machine speed to slow carriage speed to cause the machine to sew a higher number of shorter stitches or a lower number of longer stitches per inch of carriage travel; and a change in the stroke of the work feeding jaws to accomodate the shorter or longer stitch length. Changes of this character involve a substantial reorganization of the entire assembly.

The principal objects of this invention are: to reduce sewing machine breakdowns to a substantial degree; to eliminate the necessity of oscillating a large unwieldy mass of metal in the sewing machine; to simplify the sewing machine structure; and to render the apparatus as a whole readily adjustable to sew stitches of different lengths over a relatively wide range.

Other important objects of the present invention are to improve the structure and operation of one or more of such elements of the machine as: the needle; the presser foot; the feeding jaws; and the drive means.

These objects are accomplished largely by: (1) eliminating the oscillating frame; (2) mounting the needle directly on the housing for vertical movement only; (3) improving the mounting of the presser foot on the housing; (4) mounting the jaws on an oscillating gate hinged to the housing; (5) connecting that gate to the common drive means of the sewing machine through an adjustable linkage controlling the angle of oscillation; and (6) rendering the common drive means of the sewing machine adjustable so that its reciprocating needle speed may be increased or decreased over a relatively wide range relative to the lineal carriage speed to change the "fast-slow" ratio therebetween and thereby provide a desired number of needle reciprocations or stitches per lineal inch of forward travel.

With the sewing needle mounted on the housing for vertical movement only, the needle is made to penetrate the work while work is clamped by the vertically movable presser foot rather than by the horizontally moving jaws. Also, while the "fast-slow" speed ratio adjustment of the apparatus and the feeding movement adjustment of the movable jaws are made independently, it is not necessary that the magnitude of these adjustments precisely correspond to each other. For example, if 8 stitches per inch is desired, the "throw" of the movable jaws should be adjusted to a little more than ⅛ of an inch while the sewing machine speed should be adjusted to produce 8 reciprocations of the needle during each inch of carriage travel. But I have found that the machine will operate satisfactorily if the throw of the jaws is adjusted to a value slightly greater or smaller than the absolutely correct value. Since the proper adjustment need only be approximated, it can be rapidly made and still obtain perfectly satisfactory results.

The invention is illustrated in the accompanying drawings wherein:

Fig. 1 is a perspective view of the mattress edge sewing apparatus of the present invention sewing the edge seam of a mattress;

Fig. 2 is an enlarged perspective view of the sewing machine of Fig. 1;

Fig. 4 is a vertical section of the upper portion of the carriage which supports the sewing machine;

Fig. 7 is a perspective view of the upper and lower work feeding and clamping jaws of the sewing machine;

Figures 8A, 8B:
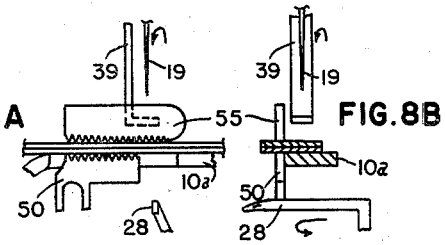
Figures 9A, 9B:
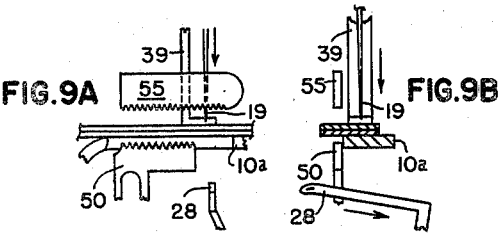
Figures 10A, 10B:
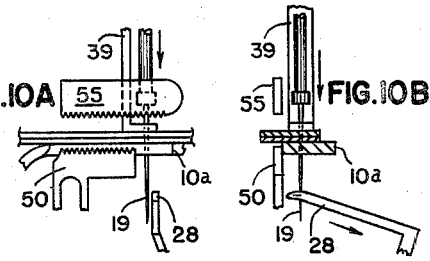
Figures 11A, 11B:
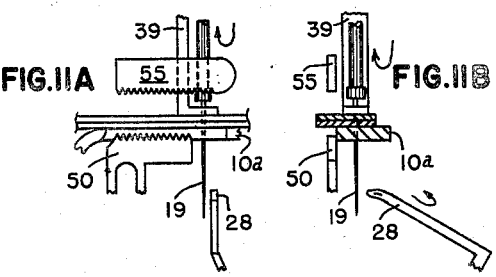
Figures 12A, 12B:
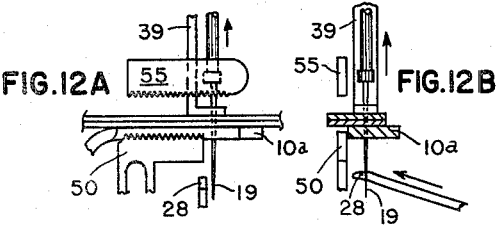
Figure 16:
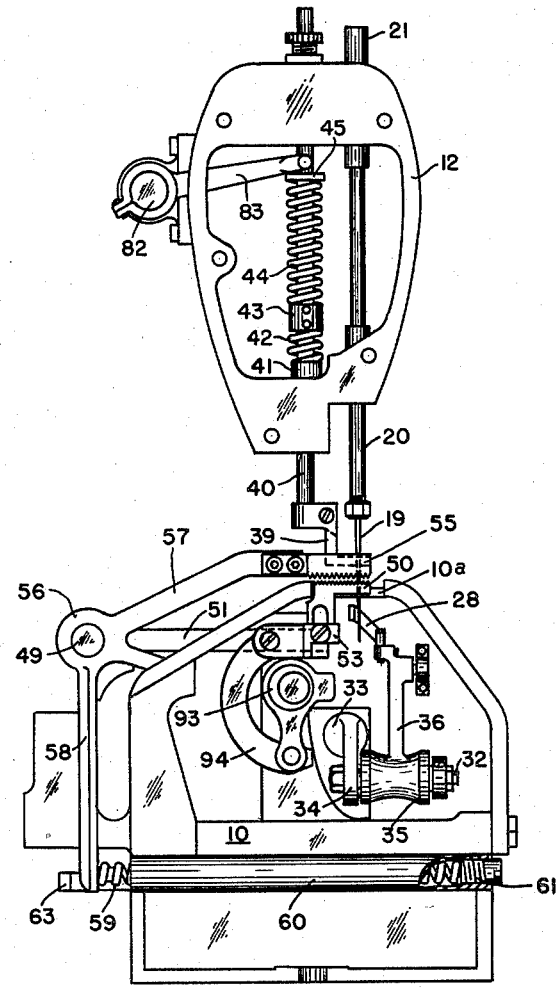
Figures 6A, 6B:
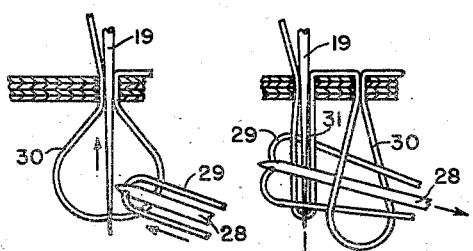
Figs. 6A and 6B are schematic views showing the relationship of the needle, looper and their respective loops during the formation of a first needle loop in Fig. 6A and a second needle loop in Fig. 6B.
Figure 13:
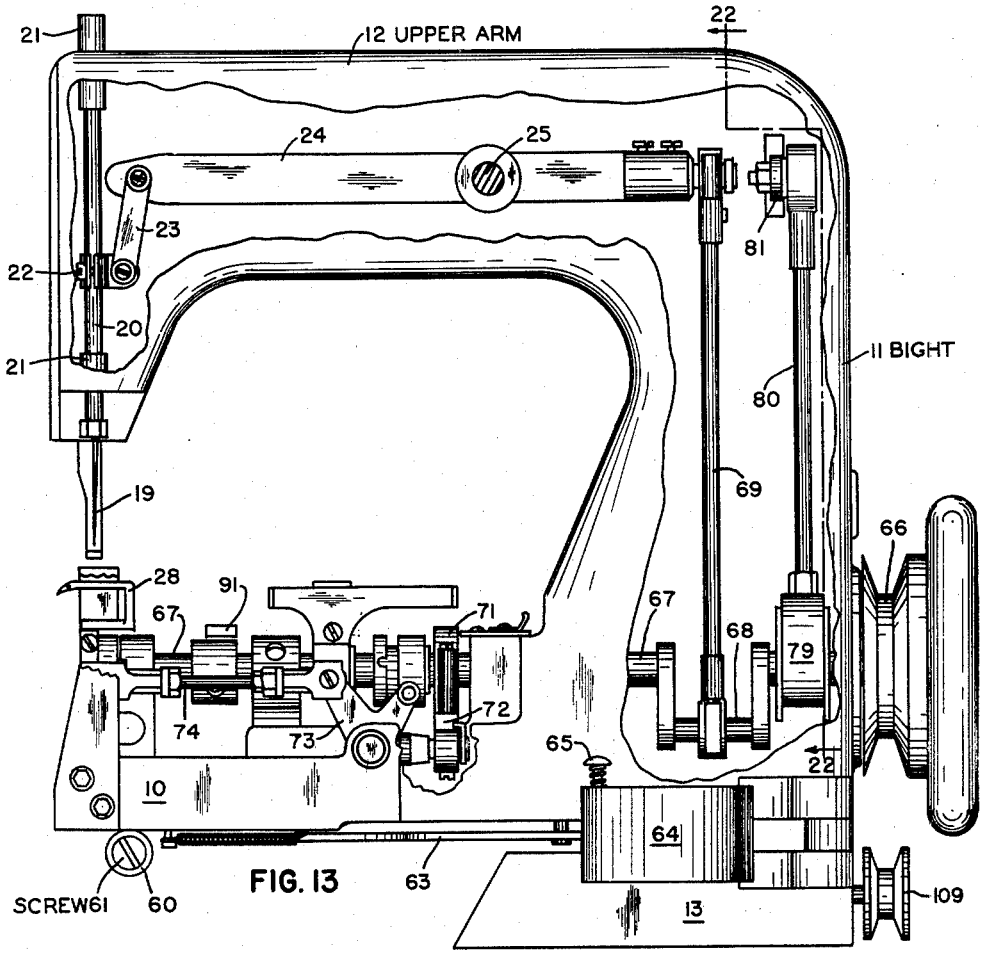
Figure 14:
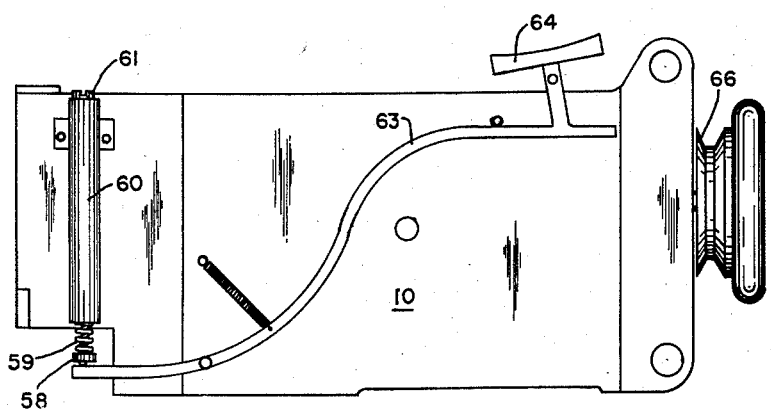
Figure 17:
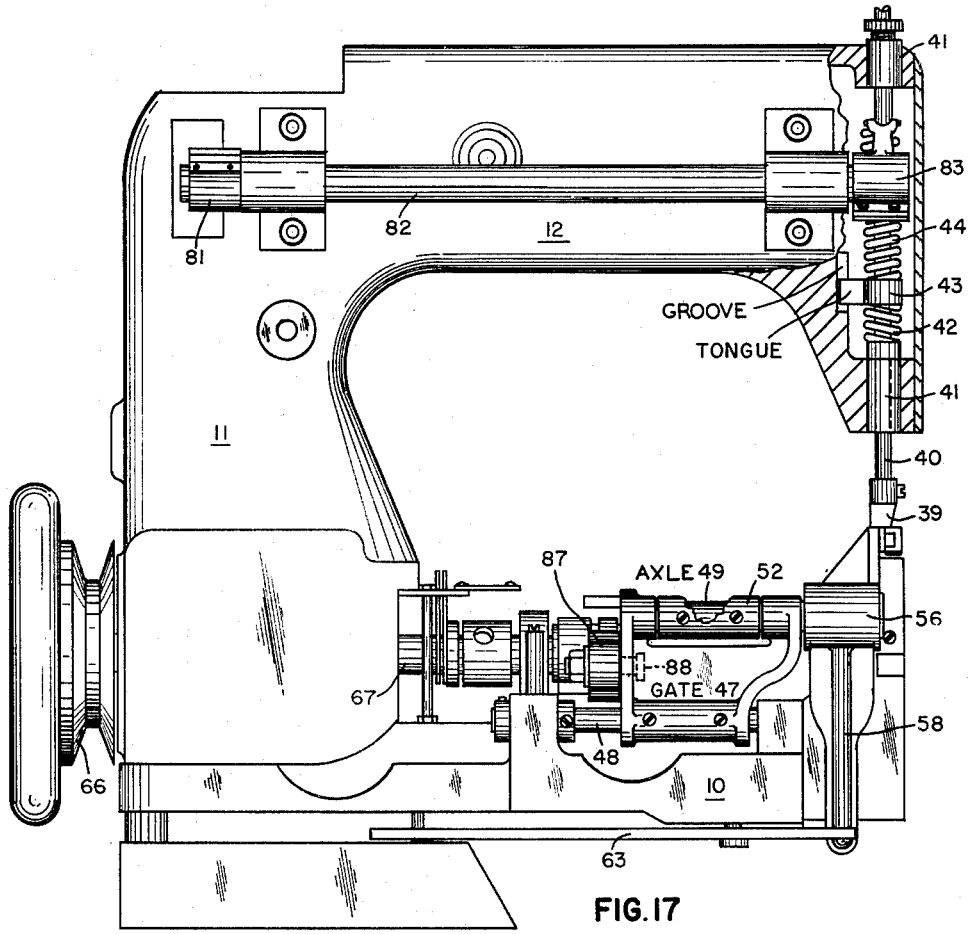
Figure 18:
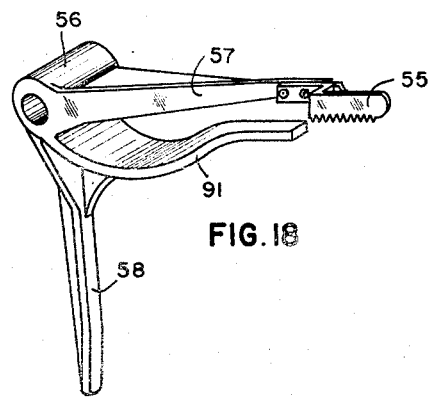
Figure 19:
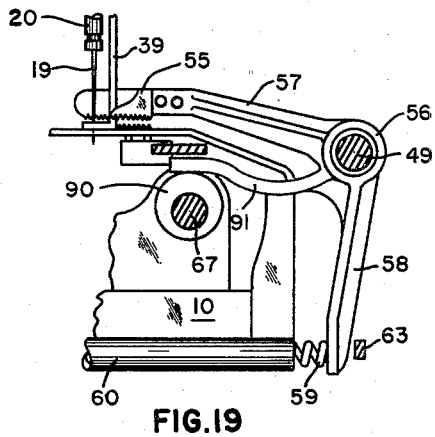
Figure 20:
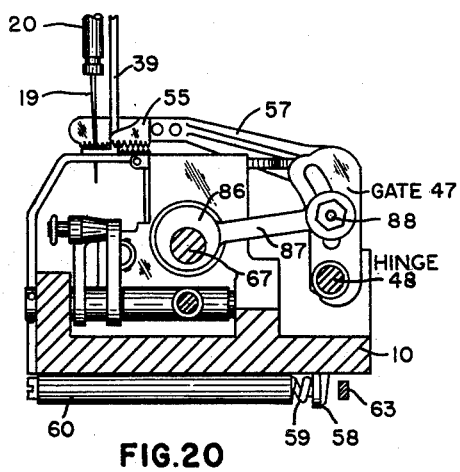
Figure 21:
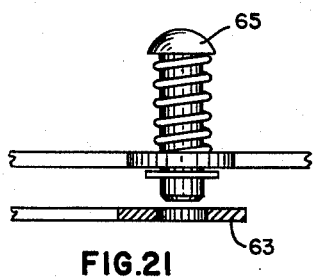

Figs. 8–12 are schematic views showing the positional relationship of the needle, looper, presser bar and feed jaws with the needle fully extended in Figs. 8A and 8B, with the needle partially extended to the point where it is about to penetrate the work in Figs. 9A and 9B, with the needle additionally extended to the point where it has passed through the work and has just entered a fully formed loop of the partially retracted looper in Figs. 10A and 10B, with the needle fully extended and the looper fully retracted in Figs. 11A and 11B and with the looper partially extended to the point where it has just entered the fully formed loop of the retracting needle in Figs. 12A and 12B;

Fig. 13 is a front elevational view of the sewing machine with parts of its housing removed and other parts broken away;

Fig. 14 is a reduced bottom view of Fig. 13;

Fig. 15 is a section taken on line 15—15 of Fig. 13;

Fig. 16 is an end elevational view of the sewing machine taken from the left side of Fig. 13;

Fig. 17 is a rear elevational view of the sewing machine with parts broken away;

Fig. 18 is a perspective view of the upper work feeding jaw crank member of the sewing machine;

Fig. 19 is a section taken on line 19—19 of Fig. 15;

Fig. 20 is a section taken on line 20—20 of Fig. 15;

Fig. 21 is a section taken on line 21—21 of Fig. 15; and

Figure 22:
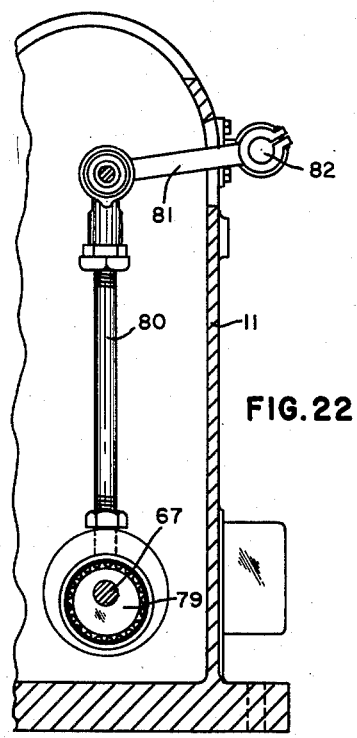

Fig. 22 is a section taken on line 22—22 of Fig. 13.

BASIC ELEMENTS—FIG. 1

The mattress edge sewing apparatus, as illustrated in Fig. 1 broadly includes the four basic elements of the conventional machine. These are: a mattress supporting table; a carriage unit mounted on the table for movement around its periphery; a mattress edge sewing machine unit mounted on the carriage; and drive means to move the carriage around the table at a fixed slow speed and to operate the sewing machine at a fixed relatively high speed to sew a fixed number of stitches (say, 5 to 9) per inch.

TABLE (FIGS. 1–2)

The table 1 conventionally includes: an upper table, also designated 1, for supporting a mattress 2; a lower base table 3; a conventional elevating mechanism, not shown, adjustably mounting the upper table 1 to be raised and lowered to accommodate mattresses of different thicknesses; and means providing upper and lower trackways 4 and 5 extending around the periphery of the lower or base table 3.

CARRIAGE UNIT (FIGS. 1, 4)

The carriage 6 includes: a hollow casing; and means movably mounting it upon the trackways.

The hollow casing, also designated 6, is conventionally supported on the upper trackway 4 by a group of rollers 7 and against the outer face of the lower trackway 5 by a single roller 8. The casing 6 extends vertically with its bottom adjacent the lower trackway 5 and with its top sufficiently above the level of the upper trackway 4 to support the sewing machine at a desired elevation.

SEWING MACHINE UNIT

The sewing machine unit includes: a frame mounted on the carriage; stitching means including a sewing needle and a thread locking means; a presser foot; a pair of work feeding jaws; latch means for holding the upper jaw open; and a common drive means for the stitching means, presser foot and feeding jaws.

Sewing machine frame—Figs. 1 and 2

The frame includes a hollow housing 10, which, as seen in Figs. 1 and 2, is of general C-shape having a hollow horizontal base, also designated 10, a hollow vertical bight 11, and a hollow upper horizontal arm 12, which is vertically spaced from the base 10 to accommodate the work which moves between the free ends of the base 10 and arm 12 during the sewing operation. The bight end of the base 10 carries a depending base frame 13 through which it is mounted upon the top of the carriage casing.

The sewing machine unit is conventionally mounted on the top of the carriage 6 in a manner permitting the sewing machine to be angularly adjusted to a tilted position in which the free ends of its base 10 and arm 12 press with equal force against the top and adjacent side faces, respectively, of a mattress 2 on the upper table. This adjustable mounting is accomplished by rigidly securing the sewing machine base frame 13 to the bight of a channel plate 15, which is inverted over the top of the carriage, by pivotally securing the depending sides of the inverted channel 15 to the adjacent sides of the carriage casing 6 through trunnions 16 and by pivotally linking the channel plate 15, at a point spaced from the trunnion pivots 16, to a tilt adjusting screw 17 carried by the casing 6.

Stitching means (Figs. 13 and 15–16)

The needle (Fig. 13)

The sewing thread needle 19 is secured to the lower end of a slide rod 20 which is vertically arranged within the free end of the upper arm 12 of the housing and slidably guided thereby, through lower and upper bearing sleeves 21, during vertical reciprocation which carries the needle downwardly into and upwardly out of an aperture in the base 10 of the sewing machine housing. The needle 19 and rod 20 are supported for vertical reciprocation by a linkage comprising: an adjustable clamp 22 on rod 20; a link 23 vertically arranged within the free end of arm 12 with its lower end pivotally connected to clamp 22; and a seesaw 24 connected to the upper end of link 23 and extending, from that connection, horizontally through arm 12 to the bight end thereof, this seesaw being pivoted at an intermediate point 25 to the arm 12. With this arrangement, as the seesaw 24 is oscillated about pivot 25, it reciprocates needle 19 through the work on base 10.

For the sake of clarity, we note: that the sewing needle has a front face which faces in the direction of the sewing, a rear face which faces in the direction of the work feed, an inner side which is on the bight side of the sewing machine and an outer side which is on the mattress side thereof; and that as it progressively extended downwardly it forms and progressively enlarges its sewing thread loop; and that as it is progressively retracted upwardly it will tend to carry the sewing thread loop with it unless that loop is restrained by the thread locking means.

The thread locking means (Figs. 13, 15 and 16)

The locking thread needle or looper 28 reciprocates horizontally underneath the work transversely across the sewing line from a retracted needle-clearing position on the inner side of the sewing needle 19 to an extended position crossing the sewing line and placing its pointed end on the outer side of the needle 19. As the looper 28 is progressively extended outwardly it forms and progressively enlarges its locking thread loop; and as it is progressively retracted inwardly it will tend to carry the locking thread loop with it unless that loop is restrained by the needle 19.

The looper 28 conventionally cooperates with the needle 19 to form a "two thread lock chain stitch." In forming this type of stitch, it is necessary to extend the looper while retracting the needle and to extend the needle while retracting the looper. Specifically it is necessary: (a) to extend the looper 28 (and its progressively increasing loop 29) in endwise fashion horizontally across the rear face of the upwardly retracting needle 19 so that both looper 28 and its loop 29 will enter the fully formed needle loop 30 in time for looper 28 to engage the bight of needle loop 30 on the rear side of the needle and hold that bight to restrain needle loop 30 while the needle completes its retraction; (b) to extend the needle 19 (and its next progressively increasing needle loop 31) in endwise fashion downwardly across the rear face of the inwardly retracting looper 28 with its fully formed locking loop 29 so that both the needle 19 and its new loop 31 will enter the fully formed locking loop 29 in time for needle 19 to engage the bight of locking loop 29 on the rear side of the looper and hold that bight while the looper 28 completes its retraction; and (c) to rock the looper sidewise, from the outer end of its extension path to the outer end of the retraction path and from the inner end of the retraction path to the inner end of the extension path.

The looper 28 is mounted for endwise reciprocation about the center of an axle 32 and for sidewise rocking movement about the axis of rocker shaft 33 by providing the outer end of rocker shaft 33 with a lug 34, which supports the axle 32, and by mounting, on the axle 32, a hub 35 having a vertical spoke 36, which carries the looper 28 at its outer or upper end.

Presser foot (Figs. 16 and 17)

The presser foot 39 is reciprocated to extend it downwardly to clamp the work against the base between work feeding intervals or from the time the downwardly moving needle 19 is about to engage the work until the upwardly moving needle 19 is definitely disengaged from the work and retracted upwardly to remain out of engagement with the work during the work feeding cycle which follows the sewing cycle.

The presser foot 39 is secured to the lower end of a slide rod 40 which is vertically arranged within the free end of the arm 12 and slidably guided thereby through lower and upper bearing sleeves 41. The rod is urged upwardly toward its retracted position by a spring 42 positioned between the lower sleeve 41 and a collar 43 which is rigidly secured to the rod, this collar cooperating with the adjacent portion of the housing to provide a tongue and groove connection therebetween which permits the presser foot slide rod 40 to reciprocate vertically without turning horizontally.

The rod 40 is also encircled by a stronger spring 44 between the fixed collar 43 and a sliding collar 45 through which the presser foot may be urged resiliently downward. This novel arrangement accommodates changes in the thickness of the work and promotes quick vibrationless operation.

Work feeding jaws (Figs. 7 and 15–20)

A pair of feeding jaws are mounted on the base. One is located above the work in position to straddle the presser foot opening 39a through which the sewing needle 19 reciprocates. The other is located below the work in position to straddle that portion of a base plate 10a in the base 10 which contains the opening 10b through which the sewing needle 19 also reciprocates.

The feeding jaws are arranged: (a) for vertical closing and opening movement to clamp and release the work; and (b) for horizontal forward and rearward movement to pull or feed the work rearwardly. These movements are secured by hinging the lower horizontal edge of an upright gate 47 to the base for angular forward and rearward movement about a hinge 48 and by providing the upper horizontal edge of the gate 47 with an axle 49 to which both jaws are connected for reciprocating movement therewith and for angular movement thereabout.

Lower jaw (Figs. 7 and 15–17)

The lower jaw 50 is pivotally mounted on the axle 49 of hinged gate 47 through a horizontally extending arm 51, having an axle receiving hub 52 at its rear end. The horizontal arm 51 extends from hub 52 forwardly and laterally outward and terminates in an outwardly directed end portion spaced below the lower jaw 50 and adjustably connected to it through a clamping bracket 53 which may be loosened to permit the level of the lower jaw 50 to be adjusted and then tightened to hold that jaw in its adjusted position.

Upper jaw (Figs. 7, 18–19)

The upper jaw 55, is pivotally mounted on the gate axle 49 through a bell crank 56, having an axle-receiving hub also designated 56, a horizontal arm 57 carrying the jaw 55 and a vertical arm 58. This jaw is resiliently urged toward its work clamping and feeding position by a coil spring 59 which is mounted to project from within a tubular housing 60 carried by the underside of the sewing machine base. The spring 59 projects from one end of the tubular housing 60 into engagement with the lower end of vertical arm 58 of the bell crank and exerts a yieldable force which may be varied by an adjusting screw 61 at the other end of the tubular housing 60.

Latching upper jaw in open position (Figs. 14, 17 and 21)

In order to insert and remove work from the machine, it is necessary to raise the needle 19, the presser foot 39 and the upper jaw 55. The needle and presser foot can be raised simply by manually operating the sewing machine until both of these parts are retracted. While the upper jaw can be moved to its open position by manually operating the vertical arm 58 of the bell crank in the direction required to compress spring 59, it is desirable to provide manually operable latch means for this purpose.

To this end, the bottom face of the base 10 of the machine is provided with a pivoted latch lever 63 which is yieldably urged in one direction towards its inoperative position and provided with a pad 64 at one end through which it may be manually engaged and moved about its pivot in the opposite direction to engage and move the vertical arm 58 of the bell crank to open upper jaw 55. To latch the upper jaw in its open position, a detent 65 is suitably mounted on base 10 for movement from a spring biased normally inoperative position to a latching position in which it extends into a hole in lever 63 near pad 64. The frictional contact between the lever and the detent holds the detent in its operative position. To unlatch the jaw, it is only necessary to give the pad 64 of lever 63 a slight tap.

Common drive for stitching means, presser foot and jaws (Figs. 13, 15, 17, 19–20 and 22)

The common drive means of the sewing machine operates: (a) to reciprocate the needle a desired number of times, say 5 to 9, during each forward inch of travel; (b) to reciprocate and rock the thread locking means in timed relationship with the needle so as to cooperate therewith in locking the stitch; (c) to reciprocate the presser foot in timed relationship with the needle so as to clamp the work against the base during an interval beginning immediately before the needle enters the work and ending immediately after the needle leaves the work and to hold the presser foot out of engagement with the work during the work feeding interval; and (d) to reciprocate and rock the jaws in timed relationship with the presser foot so as to close the jaws on the work just as the presser foot releases the work, move the closed jaws rearwardly to feed the work, open the jaws just as the presser foot reengages the work and move the open jaws forwardly between work feeding intervals.

This common drive means includes: a pulley 66 located outside of the C-shaped frame at the lower end of its outer bight wall; and a shaft 67 which extends from that pulley horizontally through the base 10 of the sewing machine to terminate under and slightly to the rear of the lower jaw adjusting bracket 53.

Needle drive (Fig. 13)

Sewing needle 19 is conventionally driven by shaft 67 through a crank 68 which is connected by rod 69 to the seesaw 24. Each rotation of shaft 67 results in one complete reciprocation of the needle 19; hence, for 5 to 9 stitches per inch, the sewing machine shaft 67 must rotate 5 to 9 times during each inch of carriage travel.

*Thread locking means or looper drive (Figs. 13, 15 and 16)*

The looper 28 is conventionally reciprocated by the shaft 67 through an eccentric 71 on shaft 67, pitman 72, bell crank 73 and linkage 74, the latter being connected to the upper end of the upright spoke 36 which carries the looper 28.

The looper 28 is also conventionally rocked by the shaft 67 through an eccentric 76 and a linkage 77 connecting shaft 67 to the rock shaft 33.

*Presser foot drive (Figs. 13, 16, 17 and 22)*

The presser foot 39 is reciprocated by the cooperative action of shaft 67 and presser foot spring 44. The presser foot is moved downwardly by the shaft 67 through a connection comprising: an eccentric 79 on shaft 67; a rod 80 connected to be reciprocated by the eccentric; and a double armed crank shaft (composed of crank arms 81 and 83 at opposite ends of a rock shaft 82) for transmitting the downward movement of rod 80 to the washer 45 on the presser foot slide rod 40. Thus, as the shaft 67 rotates, the eccentric 79 reciprocates rod 80 vertically and this reciprocation rocks the rock shaft 82 to swing arm 83 downwardly and upwardly. The downwardly moving arm 83 operates, through spring 44, to urge the presser foot resiliently downward while spring 42 on the presser foot, operates, when arm 83 moves upwardly, to urge the presser foot yieldably upward.

*Feed jaw drive (Figs. 15–20)*

The feed jaws are reciprocated by the shaft 67 through its eccentric 86 which is connected through arm 87 to rock the gate 47 about hinge 48. Among the important advantages of this particular arrangements are: (*a*) that it is compact, being completely mounted entirely within a relatively small portion of the available space of the base 10; (*b*) that it is light in weight thus minimizing the power it requires for oscillation and reducing the vibrations set up by its oscillation to insignificant proportions; and (*c*) it enables the arm 87 to be adjustably connected to the gate 47 through a slot and pin connection 88 to provide a very easy and simple way of adjusting the throw of the jaws by lengthening or shortening the distance between hinge 48 and connection 88.

As previously noted the upper jaw is urged toward the closed position by spring 59 in housing 60. To open the upper jaw, the shaft 67 is provided with a cam 90 and the bell crank 51 is provided with cam engaging arm 91. The cam 90 operates through arm 91 to open the upper jaw but it moves out of engagement with the arm 91 during the closure of the upper jaw so as to enable the spring 59 to determine the force with which the upper jaw is closed and to permit that force to be adjusted by adjusting the spring.

The shaft 67 opens and closes the lower jaw positively through a connection comprising: an eccentric 93 on the outer end of the shaft 67; and an arm 94 connected to transmit the vertical motion of that eccentric to the outer end of the lower jaw.

DRIVE MEANS (FIGS. 1 AND 3)

The main drive means operates to move the carriage around the table at a fixed slow speed and to operate the sewing machine at a fixed relatively high speed.

Figure 3:
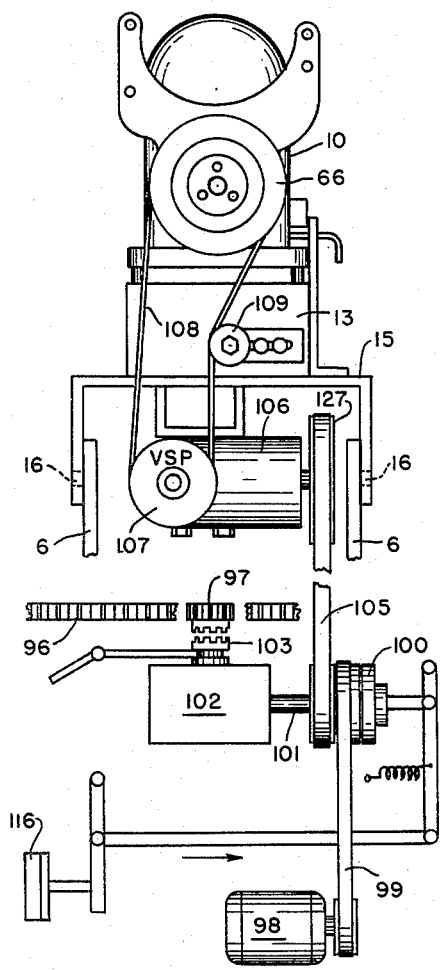
Fig. 3 is an elevational view of the drive system for the mattress edge sewing apparatus with the walls of the carriage broken away.
Figure 5:
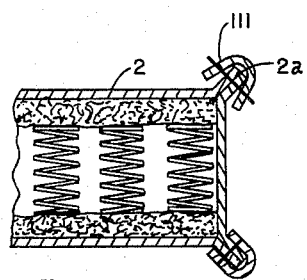
Fig. 5 is a section of an edge portion of a typical mattress.

*Carriage drive (Figs. 1 and 3)*

The upper trackway of the base table 3 is provided with an endless stationary rack 96 while the carriage contains a pinion 97 meshing with the rack 96. This pinion is driven from a carriage supported motor 98 through a drive including a motor driven belt 99, a belt driven clutch 100 which is normally closed to connect the belt pulley to shaft 101, a gear reducer 102 connecting the relatively fast rotating shaft 101 to slow moving clutch 103 which is normally closed to rotate the carriage pinion 97.

*Sewing machine drive (Fig. 3)*

The sewing machine and carriage drives commonly include: the motor 98; belt 99; clutch 100; and the rapidly rotating shaft 101. The sewing machine drive, which separates from the carriage drive immediately before the speed reducer 102, connects the rapidly moving shaft 101 to the sewing machine pulley 66.

This separate connection includes a belt 105 connecting the shaft 101 to a miter gear unit 106. In accordance with a particular feature of my invention, the connection includes: a variable speed pulley 107, on the driven end of the miter box 106; a belt 108 connecting the variable speed pulley to the sewing machine pulley 66; and an adjustable idler pulley 109.

OPERATION

*Adjusting the apparatus*

Before instituting operation upon a mattress which is placed upon the upper table 1, a number of adjustments may be in order. These are hereafter mentioned as if they were required to be made.

First the height of the table is adjusted, as required by the mattress thickness, to place the perimetric upper corner flange 2*a* at the appropriate sewing height. Second the carriage can be manually adjusted to any desired position along the periphery of the table 1 simply by opening the normally closed clutch 103 to disconnect the carriage from the rack and pinion and by pushing the disconnected carriage to the desired location whereupon the clutch 103 should be reclosed. Third, the sewing machine is manually operated to retract the sewing needle 19 and presser foot 39, to their respective raised positions and to close the jaws 50 and 55. Fourth the latch lever 63 and detent 65 are operated to move the upper jaw to and latch it in its open position so that the mattress 2 may be moved to direct its upper perimetric flange 2*a* into the sewing area between jaws. Fifth the angle of the sewing machine relatively to the top and sides of the mattress, is adjusted by appropriately operating screw 17. Sixth, the sewing machine is set to the desired stitch length by adjusting the connection of the arm 87 to the gate 47 to increase or decrease the oscillating angle of the gate and thereby correspondingly increase or decrease the throw of the jaws. Seventh the "fast-slow" ratio of the machine is correspondingly adjusted to provide five to nine sewing needle reciprocations, during each lineal inch of carriage travel, by appropriately adjusting the variable speed pulley 107 and taking up any slack by adjusting the idler pulley 109.

It may be noted that for a given stitch length the throw of the jaws will be from 25 to 40% greater than the stitch length. This is due to the fact that, during the interval in which the mattress edge is clamped between the presser foot and the base, the mattress edge is pulled forwardly with the carriage a distance approximating ¼ to ½ of the stitch length. When these parts release that edge, it will move or spring rearwardly an unknown distance, believed to approximate ½ of its forward movement, before it is effectively clamped between the feeding jaws. This "offsets" the edge forwardly a net distance of ⅟₁₆ to ¼ of the stitch length.

A tape 111 is fed from a tape roll suitably supported on the machine through a group of conventional tensioning devices 112 to a tape folder 113 which is operatively positioned adjacent the stitching mechanism of the machine and attached to one end of an arm 114 pivoted to the machine. The tape folder folds the tape along its longitudinal center line and this folded tape is trained over the perimetric upper flange of the mattress which should now extend between the needle receiving openings 39a of the presser foot and 10b of the base plate 10a.

Operating the apparatus

To institute the operation with the parts adjusted and the mattress and tape positioned, it is only necessary to start the motor 98 and thereafter maintain the proper relationship between the tape 111, the mattress flange 2a and the sewing machine 10. This machine can be operated at speeds as high as 2200 stitches per minute with relatively little vibration and noise. Normally, however, the machine must be operated at a lower speed because of the difficulties the average operator experiences in maintaining the proper relationships at such a high speed.

The operation may be stopped whenever desired either by stopping the motor 98 or by opening the normally closed clutch 100, which is in the common drive of both the carriage and the sewing machine. This clutch is opened by pressing pad 116 inwardly toward the base frame. The pad 116 is conventionally located where it may be operated by the knee of the operator and it is conventionally connected to the normally closed clutch 100.

To facilitate a better understanding of the operation of the apparatus reference will now be made to Figures 8–12 which show the positional relationships between needle 19, looper 28, presser foot 39 and lower and upper jaws 50 and 55 at certain intervals during one full reciprocation of the needle.

Thus Figs. 8A and 8B show the needle 19 and the presser foot 39 fully retracted, the looper 28 fully extended and the jaws 50 and 55 fully closed thus clamping the mattress edge between them.

Figs. 9A and 9B show the needle 19 partially extended, the looper 28 partially retracted and the presser foot 39 fully extended into its work clamping position with the needle about ready to enter that work. Since the presser foot is fully extended, the jaws 50 and 55 are fully open.

Figs. 10A and 10B show the needle 19 further but not completely extended and the looper 28 correspondingly retracted. In this position, the needle has passed entirely through the work and to a point when it crosses the rear face of the looper and barely penetrates the locking thread loop carried by the looper 28 where it becomes operative to restrain the locking thread loop against horizontal retraction as the looper retracts horizontally toward its fully retracted position. So long as the needle engages the work, the presser foot clamps the work and the jaws remain open.

Figs. 11A and 11B show the needle fully extended and the looper fully retracted. At this point the looper is rocked in the rearward direction to move from the end of its retraction path to the beginning of its extension path while the jaws remain open.

Figs. 12A and 12B show the needle partially retracted and the looper partially extended to the point where it crosses the rear face of the needle and barely penetrates the fully formed needle thread loop where it becomes operative to hold that needle thread loop against upward retraction while permitting the needle to continue its upward retraction. The presser foot remains in its work clamping position while the jaws remain open.

When the needle, in continuing its retraction from the Fig. 12 position, initially disengages the work, then the retraction of the presser foot will be instituted and the jaws will be simultaneously closed. All parts now return to the Fig. 8 position where the needle is fully retracted and the looper is not only fully extended but rocked in the forward direction to move from the end of its extension path to the beginning of its retraction path. This completes one full cycle or reciprocation of needle during which one stitch was sewed. It will be understood that, during the interval the jaws engage the work, they are pulled rearwardly by the gate 47. During the interval in which the jaws were open, they are pushed forwardly by the gate. The distance over which they are thus pushed and pulled equals one stitch length plus the offset.

Having described my invention, I claim:

1. A sewing machine comprising: a housing having a base over which work is moved rearwardly as it is sewn; stitching means mounted on the housing including a needle above the work for vertical reciprocation through the work and thread locking means below the work; a presser foot mounted on the housing above the work for vertical reciprocation toward and away from the work; a pair of work clamping jaws, including an upper jaw above and a lower jaw below the work, a gate mounted on said housing for angular rearward and forward movement; means mounting both of said jaws on said gate for horizontal rearward and forward movement with said gate and for vertical closing and opening movement relatively to said gate, said mounting means pivotally connecting said upper jaw to said gate; a depending arm fixed to said upper jaw; spring means mounted on said base to engage said depending arm and, through such engagement, urge said upper jaw in the jaw closing direction; and driving means for reciprocating the needle, for operating the locking means in timed relationship with the needle so as to cooperate therewith in stitching the work, for reciprocating the presser foot in timed relationship with the needle so as to clamp the work against the base during the interval the work is engaged by the needle and for reciprocating said gate and closing and opening said jaws in timed relationship with the presser foot so as to close the jaws on the work as the presser foot releases the work, move the closed jaws rearwardly to feed the work, reopen them as the presser foot reengages the work, and move the open jaws forwardly during said presser foot reengagement.

2. The machine of claim 1 wherein: said drive means includes a rotary drive shaft extending through the housing base; oscillating means is mounted on said drive shaft; and a second arm is fixed to said upper jaw to abut said oscillatory means during oscillating movement in one direction and, through such abutment, lift said upper jaw in its jaw opening direction, said arm being free to be moved away from said oscillatory means.

3. The machine of claim 1 including: means for adjusting the tension of said jaw closing spring means.

4. The machine of claim 1 including: means for latching said upper jaw in its open position.

5. The machine of claim 4 wherein said latching means includes: a latch bar; means pivotally mounting said latch bar on said housing base for manually actuated latching movement from a non-latching position to a latching position during which movement it engages said depending arm and swings it angularly in the upper jaw opening direction against the resistance of said spring means; and detent means operable to latch said latch bar in its latching position.

6. The machine of claim 5 wherein said detent means includes: a keeper mounted on the housing for movement from an inoperative position to a blocking position in which it extends across the path of said latch bar to block its return from its latching position to its non-latching position, said keeper, in its operative blocking position, having frictional engagement with said blocked latch bar; and a spring normally urging said keeper to its inoperative position with a force insufficient to move the keeper against the frictional resistance between the keeper and the latch bar frictionally engaged by the keeper.

7. The machine of claim 1 wherein said gate is pivoted on said base and said drive means includes: a rotary drive shaft in said housing base; oscillatory means on said rotary drive shaft; a linkage directly interconnecting said oscillatory means and said gate to effect said horizontal movement of both of said jaws from the oscillation of said oscillatory means; and a slot and pin connection for varying the angular "throw" of the gate which is effected by a given oscillation of said oscillatory means, said slot being arranged so that the jaws start their work feeding movement at substantially the same location in all adjustments of the pin along the slot.

8. A carriage mounted sewing machine comprising: a sewing machine having a reciprocating needle and a drive means therefor; a carriage; means mounting said sewing machine on said carriage; a main drive means on said carriage operative to propel said carriage at a given operating speed; and means connecting said sewing machine driving means to said main drive means for driving said sewing machine therefrom, said connecting means including an adjustable speed changer for adjusting the sewing machine operating speed relatively to said given carriage operating speed so as to vary the number of sewing machine stitches effected per inch of carriage travel.

9. The sewing machine of claim 8 including: a pair of work clamping jaws; a gate pivotally carrying said jaws; a drive means for said gate; and means for varying the angular "throw" of the gate between low and high limits, said gate providing a rearward-forward jaw movement, which, at said low limit, is of the small order required when the sewing machine operates at high speed to sew a large number of stitches per inch of carriage travel, and which, at said high limit, is of the large order required when the sewing machine operates at low speed to sew a relatively small number of stitches per inch of carriage travel.

10. A carriage mounted sewing machine comprising: a sewing machine unit having a drive means; a carriage unit having a drive means; means mounting said sewing machine unit on said carriage unit for relative tilting adjustment angularly about a tilting axis; power transmitting means interconnecting the drive means on the carriage unit with the sewing machine unit drive means, said power transmitting means including first, a power transmitting assembly having a pair of interconnected rotary members, one for each unit, the rotary member for the carriage unit being adapted to receive power from the drive means for the carriage unit and the rotary member for the sewing machine unit being adapted to deliver power to the drive means for the sewing machine unit, second means connecting the drive means on the carriage unit to the rotary member for the carriage unit and third means connecting the rotary member for the sewing machine unit to the sewing machine unit drive means; and means mounting said assembly on one of said units with the axis of the rotary member for the other unit aligned with said tilt axis.

11. The apparatus of claim 10 wherein: said power transmitting means includes said power transmitting assembly, in the form of a pair of pulleys interconnected to rotate together, and a pair of power transmitting belts, one for each pulley.

12. The apparatus of claim 11 wherein: both of said pulleys are connected to each other through a gear box; and said gear box is mounted on said sewing machine unit to tilt with it.

13. A carriage mounted sewing machine comprising: a sewing machine having a drive means for operating a reciprocating sewing needle and a work feeding means in timed relationship such that one releases the work when the other engages it and vice versa, said work feeding means being adjustable to accommodate changes in the stitch length corresponding to changes in the number of stitches per inch over a predetermined range; a carriage adapted to travel along the work being sewn by said machine; means mounting said sewing machine on said carriage; a main drive means on said carriage operative to propel said carriage at a given operating speed; and means connecting said sewing machine to said main drive means for driving said sewing machine therefrom, said connecting means including variable speed-ratio means for changing the sewing machine operating speed in relation to said given carriage operating speed so that the number of stitches per inch of carriage travel can be varied over said predetermined range.

14. A carriage mounted sewing machine comprising: a sewing machine unit having drive means including a first power transmitting rotary member mounted on the sewing machine unit for rotation about a given sewing machine axis; a carriage unit having a drive means including a second power transmitting rotary member mounted on the carriage for rotation about a given carriage axis; power transmitting means interconnecting the drive means on the carriage with the sewing machine drive means, said interconnecting means including means connecting said second rotary member on the carriage unit to said first rotary member on the sewing machine; and means mounting said sewing machine unit on said carriage unit for relative tilting adjustment angularly about one of said given axes so that the tilt of said sewing machine can be adjusted without requiring a compensating adjustment in said power transmitting means.

References Cited in the file of this patent

UNITED STATES PATENTS

| | | |
|---|---|---|
| 1,136,749 | Wright | Apr. 20, 1915 |
| 1,313,265 | Corrall | Aug. 19, 1919 |
| 1,857,371 | Gail | May 10, 1932 |
| 2,185,251 | Goldberg | Jan. 2, 1940 |
| 2,339,240 | Clayton | Jan. 18, 1944 |
| 2,355,189 | Tozier | Aug. 8, 1944 |
| 2,491,622 | Schmitt | Dec. 20, 1949 |
| 2,549,057 | Chinnici | Apr. 17, 1951 |
| 2,724,352 | Gentry et al. | Nov. 22, 1955 |

FOREIGN PATENTS

| | | |
|---|---|---|
| 29,167 | Great Britain | 1911 |